Figure 1:
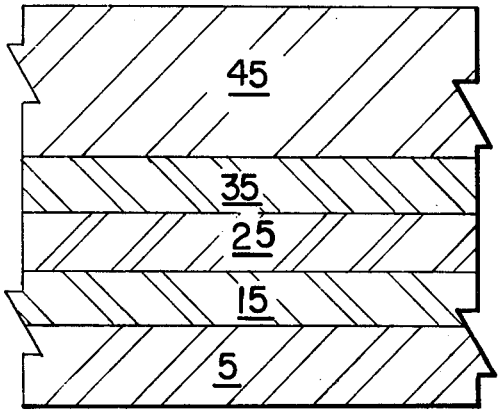

United States Patent [19]

Schwemmer et al.

[11] 4,079,168
[45] Mar. 14, 1978

[54] RUBBER-METAL COMPOSITE STRUCTURES HAVING IMPROVED RESISTANCE TO CORROSION

[75] Inventors: Leonard J. Schwemmer, Erie; William A. Richter, Wesleyville, both of Pa.

[73] Assignee: Lord Corporation, Erie, Pa.

[21] Appl. No.: 737,360

[22] Filed: Nov. 1, 1976

[51] Int. Cl.² .............................................. B32B 15/08
[52] U.S. Cl. .................................... 428/416; 156/315; 156/283; 156/330; 156/333; 428/418; 428/457; 428/462
[58] Field of Search ............... 428/416, 418, 414, 494, 428/457, 462; 156/330, 315, 283

[56] References Cited

U.S. PATENT DOCUMENTS 3,028,251  4/1962  Nagel ..................................... 428/332

FOREIGN PATENT DOCUMENTS 24,238      3/1963  Japan ..................................... 428/418
1,307,705   2/1973  United Kingdom ................. 428/418

OTHER PUBLICATIONS

Sexsmith, F. H., "Milestones in Elastomer-to-Metal Bonding Part II," appears in Adhesives Age, June 1970, pp. 31–36.

Primary Examiner—George F. Lesmes
Assistant Examiner—Alexander S. Thomas
Attorney, Agent, or Firm—John A. Gazewood

[57] ABSTRACT

Rubber-metal composite structures are provided wherein such structures comprise a metal substrate, at least a portion of at least one surface of such substrate is coated with a fused epoxy resin powder composition, and at least one elastomeric element, said elastomeric element being vulcanization bonded through an intermediate adhesive phase to at least a portion of the fused epoxy coating. Such composite structures exhibit improved resistance to corrosion.

3 Claims, 2 Drawing Figures

RUBBER-METAL COMPOSITE STRUCTURES HAVING IMPROVED RESISTANCE TO CORROSION

This invention relates to protecting metals against corrosion. More particularly, the invention relates to protecting rubber-metal composite structures from the corrosive effects of saline environments.

Rubber-metal composites are widely used in applications wherein the structures are exposed to corrosive environments such as sea water. A particular problem associated with such structures under these adverse environmental conditions is underbond corrosion, which not only results in deterioration of the metal substrate but also contributes to bond failure. While the use of coatings which completely cover the exposed metal has been effective in protecting metal surfaces per se from corrosion, the direct application of such coating technology to rubber-metal composites has not been entirely successful. For example, epoxy resin paints are extremely effective in protecting metal surfaces such as pipelines from corrosion. When applied to composites, such as rubber-metal laminates and the like, such epoxy resin-based paints continue to provide adequate protection to non-bonded metal areas, although, if the coating becomes damaged, there results an undesirable increase in corrosion in the metal areas which are contiguous to the break in the coating; however in those areas wherein the rubber, i.e., elastomeric, element is bonded to the metal, the problem of underbond corrosion is not alleviated. While the epoxy resins are generally excellent adhesive materials, they do not readily bond to cured rubber surfaces. While it is not necessary to protect the rubber surfaces themselves, it is nevertheless a practical necessity that, when the epoxy paint coating is applied after vulcanization of rubber elements, the coating cover portions of the rubber assembly contiguous to the metal surface to ensure protection of the bond line. Thus the coating must provide an adequate bond if the coating is not to fail as the structure is flexed or placed under some other type of dynamic loading. However, even in situations wherein an adequate bond is obtained, the relatively rigid cured epoxy coatings tend to crack, thereby exposing the underlying surface to the vagaries of the corrosive environment. Attempts to vulcanization-bond the rubber elements to cured epoxy paints have not been altogether successful, due not only to mold sticking, malodors, operator handling problems such as dermatitis and the like; but also because to poor compressive resistance of many of the cured epoxy paints which results in chipping of the coating into the bond line and other premature failure of the coating. These remaining problems as exemplified by epoxy resin-based paint coatings reinforce the need for some means whereby rubber-metal composite structures may be more adequately protected from corrosion.

In accordance with the present invention, it has been discovered that the resistance to corrosion of rubber-metal composite structures is greatly improved by applying to at least a portion of at least one surface of the metal substrate, including the entire area to which elastomeric elements are to be bonded, a fusible powdered epoxy resin coating composition; fusing the coating to form a continuous film; and thereafter heat-bonding the elastomeric elements to said substrate through an adhesive phase disposed between said elastomer and said fused coating.

Briefly, the present invention provides rubber-metal composite structures having an improved resistance to corrosion comprising a metal substrate, a continuous cured coating covering at least all of the area which is to be exposed to the corrosive environment and including those areas to which the elastomeric members are to be bonded, said cured coating being the fused reaction product of a fusible powdered epoxy resin coating, and at least the elastomeric member being heat-bonded to all or any portion of said exposed substrate surface through an adhesive phase disposed between said elastomeric member and said fused coating.

The invention further provides a method for making rubber-metal composite structures having an improved resistance to corrosion comprising the steps of applying a fusible epoxy resin powder coating to at least one surface of a metal substrate, at least a portion of which surface is to be exposed to a corrosive environment, so as to cover at least the portion of such surface exposed to such environment, and including all areas to which elastomeric elements are to be bonded; fusing said coating to form a continuous film covering at least the portion of said surface which is exposed to such corrosive environment; applying to at least a portion of said coated substrate surface a heat-reactive adhesive system; contacting said adhesive-coated portion of said coated substrate surface with a vulcanizable elastomer composition; and simultaneously curing by the application of heat said adhesive system and said elastomer.

Figure 2:
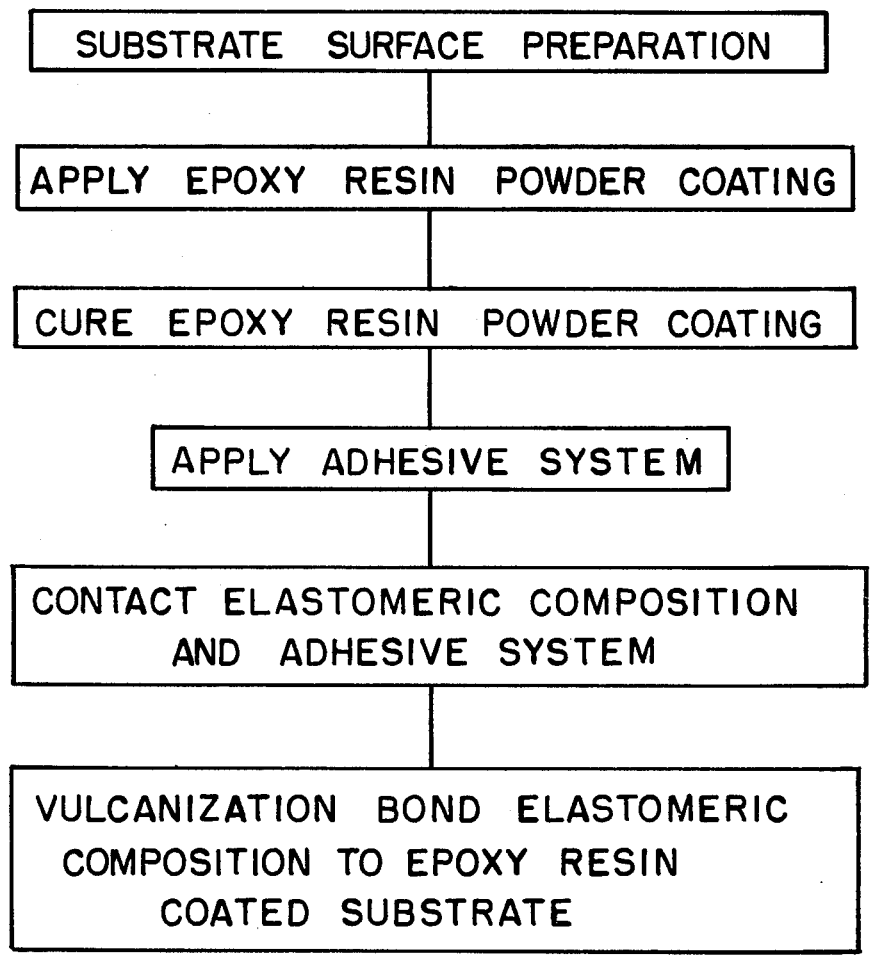

For a better understanding of the invention, reference is made to the drawings in which similar numbers refer to similar parts throughout the various Figures, and in which FIG. 1 is a cross-sectional view through a composite article showing the spatial relationship of each element; and FIG. 2 is a schematic of the preferred method for manufacturing composite articles in accordance with the invention.

The powdered epoxy resin compositions which are employed in the practice of the present invention are well-known in the art and need not be discussed here in detail. Such compositions generally comprise a blend of epoxy resin, a curing agent or hardener, pigment, filler, flow control additive, corrosion inhibitors and the like. Generally, the epoxy resin will be selected from the group consisting of glycidyl ethers of bisphenol-A resins, novolak epoxy resins and cycloaliphatic epoxy resins, all of which are well-known, with the glycidyl ethers of bisphenol-A resins being presently preferred. It will be appreciated that substantially all epoxy resins which are employed in making thermosetting powder coatings can be utilized in the practice of the invention, and it is anticipated that as new epoxy resin powders are developed and become available, such resins will likewise be suitable for use in accordance with the concept of this invention.

Substantially any of the catalysts and hardeners which are conventionally employed as curing agents for epoxy resin powder compositions can be employed in the practice of this invention. Generally, the curing agents utilized with epoxy resin powdered compositions are selected from the group consisting of aliphatic amines, aromatic amines, Lewis acids, carboxylic acids and acid anhydrides, derivatives of such compounds and including mixtures thereof, with carboxylic acids and acid anhydrides and derivatives thereof being presently preferred. Illustrative curing agents for epoxy resin powder compositions include dicyandiamide, boron trifluoride/amine complexes, azelaic acid, sebacic acid, dodecanedioic acid, itaconic acid, phthalic anhydrice, chlorendic anhydrice, maleic anhydride, trimellitic anhydride, melamine, urea-formaldehyde condensates, adipoyl dihydrazide, sebacyl dihydrazide, diamino-diphenyl methane, and the like. The curing agent is present in ranges conventionally employed with epoxy resin powders.

As noted, the epoxy resin powder compositions can also include pigments, fillers, flow control agents and other additives typically present in powder coating compositions. These additives, as well as the concentrations at which they are used, are well-known to those skilled in the art and require no further elaboration herein.

The rubber or elastomeric material employed in the practice of the invention includes natural and synthetic rubbers which are capable of being cured or vulcanized, as by the aid of heat and suitable vulcanizing agents. The vulcanizing agents can be any of those conventionally employed for this vulcanization of natural and synthetic rubbers. Representative elastomeric materials include homopolymers and copolymers of conjugated dienes such as polychloroprene, polybutadiene, polyisoprene and copolymers of chloroprene, butadiene and isoprene with vinyl monomers, such as the copolymers of butadiene-styrene, butadiene-acrylonitrile and the like, butyl rubber, copolymers of ethylene and propylene, terpolymers of ethylene, propylene and a non-conjugated diene, and the like. In addition to the elastomer and vulcanization system, the elastomeric compositions of stocks which are bonded to metal substrates in accordance with the invention include conventional compounding ingredients normally compounded into vulcanizable elastomers such as fillers, extenders, processing aids, and the like at concentrations normally employed in the art.

Metal substrates which are employed in the practice of the invention include ferrous and non-ferrous metals and alloys thereof, such as iron, copper, aluminum, brass, tin and the like. The surfaces can be flat or contoured or otherwise formed into a geometric shape such as a tube, bushing or the like.

Substantially any adhesive system which is suitable for the vulcanization bonding of elastomeric materials to metal substrates can be employed as the adhesive phase which is disposed between the vulcanizable elastomeric composition and the fused coating of the substrate. Best results are generally obtained with two-coat adhesive systems consisting of an adhesive primer and a primary adhesive overlayer. At present, a preferred two-coat adhesive system comprises a heat-reactive phenolic resin-based primer and a primary adhesive containing halogenated polyolefin binder and aromatic nitroso compound.

In preparing composite articles in accordance with this invention, at least that surface area of the substrate which is to be exposed to the corrosive environment is prepared to receive the epoxy resin in a conventional manner by the sequential steps of (i) degreasing by vapor or solvent wash, (ii) chemical etching or mechanical abrading, and (iii) degreasing. The thus-prepared surface is coated with the fusible epoxy resin powder coating using the conventional powder coating techniques known in the art, such as by fluidized bed coating method, electrostatic powder coating method, electrostatic fluidized bed coating method, a sprinkling method, a spraying method, and the like. Preferably, the substrate is heated to a temperature sufficiently high to at least soften the epoxy resin powder and coalesce the individual particles into a continuous film. The coating is cured at an elevated temperature sufficient to activate the curing agent and initiate the curing or crosslinking of the resin. After cooling, all or a part of the coated surface is contacted with an adhesive system, which is preferably permitted to dry prior to contacting the adhesive-coated areas with the vulcanizable elastomeric composition. The vulcanizable elastomeric composition is then vulcanization-bonded through the adhesive system to the coated substrate surface to provide rubber-metal composite structures having an improved resistance to corrosion.

Referring now to FIG. 1, at least a portion of a carbon steel substrate 5 is provided with a corrosion-resistant layer 15 consisting essentially of fused epoxy resin powder coating composition, an adhesive primer 25 applied by a suitable coating method over corrosion resistant layer 15, a layer of adhesive covercoat 35 applied by a suitable coating method over adhesive primer 25, and an elastomeric element 45, placed in contact with adhesive covercoat 35, the elastomeric element 45 being vulcanization-bonded to corrosion resistant layer 15 through adhesive covercoat 35 and adhesive primer 25.

Referring now to FIG. 2, there is disclosed a schematic of a preferred method for forming rubber-metal composite structures in accordance with this invention. The schematic is self-explanatory and includes the steps of preparing the substrate surface, applying the epoxy resin powder coating to the treated surface, fusing, i.e., curing, the epoxy resin to form a smooth, continuous film over the substrate, applying the adhesive system to at least a portion of the epoxy resin-coated substrate, contacting the adhesive-coated areas with the desired elastomeric element, and thereafter vulcanization-bonding said elastomeric element to said epoxy-resin coated substrate through said adhesive system.

An example of manufacturing a rubber-metal composite assembly in accordance with the invention is as follows:

Several carbon steel substrates are solvent-wiped, grit-blasted (aluminum oxide) and solvent wiped. Only that portion of the substrate which is to be exposed to a corrosive environment is cleaned. The substrates are heated to 177° C, dipped into a fluidized bed containing epoxy resin powder comprising powdered diglycidyl ether of bisphenol A epoxy resin and trimellitic anhydride curing agent, and subsequently heat cured in an oven at 232° C, and cooled. To a portion of the coated substrate there is applied a phenolic resin-based adhesive primer. After drying, the adhesive primer-coated area is overcoated with an adhesive covercoat comprising halogenated polyolefin binder and aromatic nitroso compound. After drying, the assembly is placed into a mold and a natural rubber elastomeric composition is injected under a high pressure to cover the adhesive-coated area. The elastomer and adhesive system is vulcanized at 149° C for 50 minutes.

There is no indication of the cured epoxy coating sticking to the mold surface, nor is there any indication of any crushing of the epoxy coating or flaking of the epoxy coating into the bond line.

The composite structures are subjected to boiling water (8 hrs. immersion), peel strength after immersion in boiling water for 4 hrs., 7-day oil test (immersed in MIL-L-7808) and salt spray. In at least one test, the epoxy resin coating is deliberately cut to induce corrosion of the substrate from exposure to salt spray. No change in the appearance of the coating is noted after immersion in boiling water for 8 days; samples pulled on a Scott Tensile Tester, which had been immersed in boiling water for 4 days, gave 100% rubber break. No deterioration in coating or bond area is noted after immersion at 92.2° C for 7 days in MIL-L-7808 and composites exposed to 5% salt spray solution for 30 days show no sign of deterioration, blistering, adhesive failure or corrosion creep. The data demonstrates the excellent resistance to corrosive environmental conditions of composite structures prepared in accordance with this invention.

What is claimed is:

1. A method for improving corrosion resistance of rubber-metal composite structures comprising
    coating at least a portion of at least one surface of a metal substrate with a free-flowing heat-reactive epoxy resin powder coating composition;
    curing said coating composition;
    applying to at least a portion of said coated substrate a heat-reactive adhesive system consisting essentially of an adhesive primer composition comprising at least one heat-reactive phenolic resin and an adhesive covercoat composition comprising at least one halogenated polyolefin and at least one aromatic nitroso compound;
    contacting said adhesive-coated portion of said substrate with a vulcanizable elastomer composition selected from the group consisting of natural rubber, homopolymers and copolymers of conjugated dienes, copolymers of conjugated dienes and vinyl monomers, butyl rubber, copolymers of ethylene and propylene, and terpolymers of ethylene, propylene and a non-conjugated diene; and
    simultaneously curing by the application of heat said adhesive system and said elastomer composition.

2. A method according to claim 1 wherein the curing of the epoxy resin powder coating composition is effected at an elevated temperature.

3. Rubber-metal composite structure comprising
    a metal substrate
    a coating covering at least a portion of at least one surface of said substrate, said coating being the cured reaction product of a heat-reactive epoxy resin powder composition comprising epoxy resin and curing agent;
    a cured elastomer bonded to at least a portion of said coating through an adhesive phase disposed between said coating and said elastomer, said elastomer being selected from the group consisting of natural rubber, homopolymers and copolymers of conjugated dienes, copolymers of conjugated dienes and vinyl monomers, butyl rubber, copolymers of ethylene and propylene, and terpolymers of ethylene, propylene and a non-conjugated diene; said adhesive phase in its uncured state consisting essentially of an adhesive primer comprising at least one heat-reactive phenolic resin and an adhesive covercoat composition comprising at least one halogenated polyolefin and at least one aromatic nitroso compound.

* * * * *